United States Patent [19]

Jung

[11] Patent Number: 5,488,434
[45] Date of Patent: Jan. 30, 1996

[54] PICTURE ADJUSTING METHOD OF A COLOR TELEVISION AND ITS CIRCUIT

[75] Inventor: Tae-Hong Jung, Seoul, Rep. of Korea

[73] Assignee: SamSung Electronics Co., Ltd., Kyungki-do, Rep. of Korea

[21] Appl. No.: 882,864

[22] Filed: May 14, 1992

[30] Foreign Application Priority Data

May 16, 1991 [KR] Rep. of Korea .................. 91-7983

[51] Int. Cl.$^6$ .................. H04N 5/44; H04N 5/58; H04N 5/235

[52] U.S. Cl. .................. 348/725; 348/603; 348/647; 348/679; 348/687

[58] Field of Search .................. 358/161, 168, 358/169, 27, 28, 56, 64, 188, 242, 83, 160, 21 R, 194.1; 395/3, 61, 900; 348/553, 602, 603, 647, 648, 646, 645, 649, 651, 656, 672, 673, 674, 675, 678, 679, 687, 708, 720, 721, 725, 728, 734, 739, 844, 571, 2; H04N 5/58, 5/235, 5/57, 5/47, 5/52

[56] References Cited

U.S. PATENT DOCUMENTS

| | | | |
|---|---|---|---|
| 4,843,464 | 6/1989 | Choi | 358/168 X |
| 4,952,917 | 8/1990 | Yabuuchi | 358/168 X |
| 4,965,574 | 10/1990 | Fukushima et al. | 358/161 X |
| 5,045,926 | 9/1991 | Amano et al. | 358/27 X |
| 5,191,421 | 3/1993 | Hwang | 358/168 |
| 5,243,687 | 9/1993 | Ando et al. | 395/3 |

FOREIGN PATENT DOCUMENTS

| | | | |
|---|---|---|---|
| 59-066280 | 4/1984 | Japan | 358/161 |
| 52-202779 | 11/1984 | Japan | 358/161 |
| 1290385 | 11/1989 | Japan | H04N 5/44 |
| 2105889 | 3/1983 | United Kingdom | 358/188 |

OTHER PUBLICATIONS

Oki Electric Industry Co., Ltd., "Fuzzy Logic Single-Chip Solution", MSM91V112, Corporated Advertisement.

*Primary Examiner*—James J. Groody
*Assistant Examiner*—Safet Metjahic
*Attorney, Agent, or Firm*—Robert E. Bushnell

[57] ABSTRACT

The present invention relates to a picture adjusting method of a color television and its circuit for obtaining enhanced picture resolution by automatically adjusting the contrast, a brightness and sharpness of a picture in accordance with the ambient brightness, picture brightness, magnitude of RF signals and viewing distances of a remote controller from a television screen, utilizing either a set of fuzzy logic rules with fuzzy logic reasoning, or a look-up table having data corresponding to the detected ambient brightness, picture brightness, magnitude of the RF signals and the viewing distances of the remote controller from the television screen.

19 Claims, 3 Drawing Sheets

PICTURE ADJUSTING METHOD OF A COLOR TELEVISION AND ITS CIRCUIT

BACKGROUND OF THE INVENTION

1. Field of the Invention

The present invention relates to a picture adjusting method and its circuit for automatically adjusting contrast, brightness and sharpness of a picture utilizing fuzzy logic reasoning in accordance with the ambient brightness, picture brightness, magnitude of RF signals and a viewing distance between a remote controller and a television screen.

2. Description of the Prior Art

In the case of conventional color televisions, whereby the contrast, brightness and sharpness of a picture are required to be manually adjusted individually by the user in accordance with ambient conditions, it is impossible to adjust the picture in accordance with the ambient brightness, picture brightness and magnitude of RF signals in order to obtain an enhanced picture resolution.

Accordingly, it is an object of the present invention to provide a picture adjusting method for a color television and its circuit which can automatically adjust the contrast, brightness and sharpness of a picture in accordance with the ambient brightness, picture brightness, magnitude of the RF signals and a viewing distance between a remote controller and a television screen.

It is another object of the present invention to provide a picture adjusting method of a color television and its circuit which can reproduce an enhanced picture resolution by adjusting the contrast, brightness and sharpness of a picture utilizing fuzzy logic reasoning.

SUMMARY OF THE INVENTION

The present invention relates to a picture adjusting method and its circuit whereby the contrast, brightness and sharpness of a picture are automatically adjusted utilizing fuzzy logic reasoning in accordance with the ambient brightness, picture brightness, magnitude of RF signals and the viewing distance.

The present invention is directed to a picture adjusting method which comprises a first process for generating addresses by reading information data of the ambient brightness, picture brightness, magnitude of the RF signals and the viewing distance, and a second process for adjusting the contrast, brightness and sharpness of a picture upon deciding adjusted values in accordance with data from a look-up table corresponding with the addresses generated from the first process.

The picture adjusting circuit of the present invention comprises:

a sensing circuit which senses the ambient brightness, picture brightness and magnitude of the RF signals of a picture;

a data converter which converts the signals representative of the ambient brightness, picture brightness and magnitude of the RF signals sensed by the sensing circuit into digital signals;

a remote controller signal receiver which determines a viewing distance (i.e. a distance between a remote controller and a television screen) according to the signals transmitted from the remote controller (herein after called as remocon);

a membership function signal storing circuit which stores membership function reference signals for discriminating the ambient brightness, picture brightness and magnitude of the RF signals digitalized by the data converter, and for discriminating the signals representative of a viewing distance determined by the remocon signal receiver;

a fuzzy rule storing circuit which stores fuzzy rules for adjusting the ambient brightness, picture brightness and magnitude of the RF signals discriminated by the membership function reference signals of the membership function signal storing circuit, and for adjusting the contrast, brightness and sharpness of a picture in dependence upon the signals representative of a viewing distance;

a fuzzy logic circuit which decides the ambient brightness, picture brightness and magnitude of the RF signals digitalized by the data converter, and determines the adjusted values of the contrast, brightness and sharpness of a picture in accordance with the signals representative of a viewing distance signals; and an image signal treatment circuit which performs adjustment of contrast, brightness and sharpness of a picture in accordance with the values decided by the fuzzy logic circuit.

Another embodiment of the picture adjustment circuit according to the present invention comprises:

a sensing circuit which senses the ambient brightness, picture brightness and magnitude of the RF signals of a picture;

a data converter which converts the signals representative of the ambient brightness, picture brightness and magnitude of the RF signals sensed by the sensing circuit into digital signals;

a remocon signal receiver which determines a viewing distance between a remocon and a television screen according to the signals transmitted from the remocon;

a microprocessor which decides adjusted values representative of the contrast, brightness and sharpness of a picture upon reception of the signals representative of the viewing distance determined by the remocon signal receiver and the digital signals representative of the ambient brightness, picture brightness and magnitude of the RF signals digitalized by the data converter; and an image treatment circuit which performs adjustment of the contrast, brightness and sharpness of a picture in accordance with the adjusted values decided by the microprocessor.

BRIEF DESCRIPTION OF THE DRAWINGS

For better understanding of the nature and objects of the invention, reference should be made to the following detailed description taken in conjunction with the accompanying drawings in which.

DETAILED DESCRIPTION OF THE INVENTION

Figure 1:
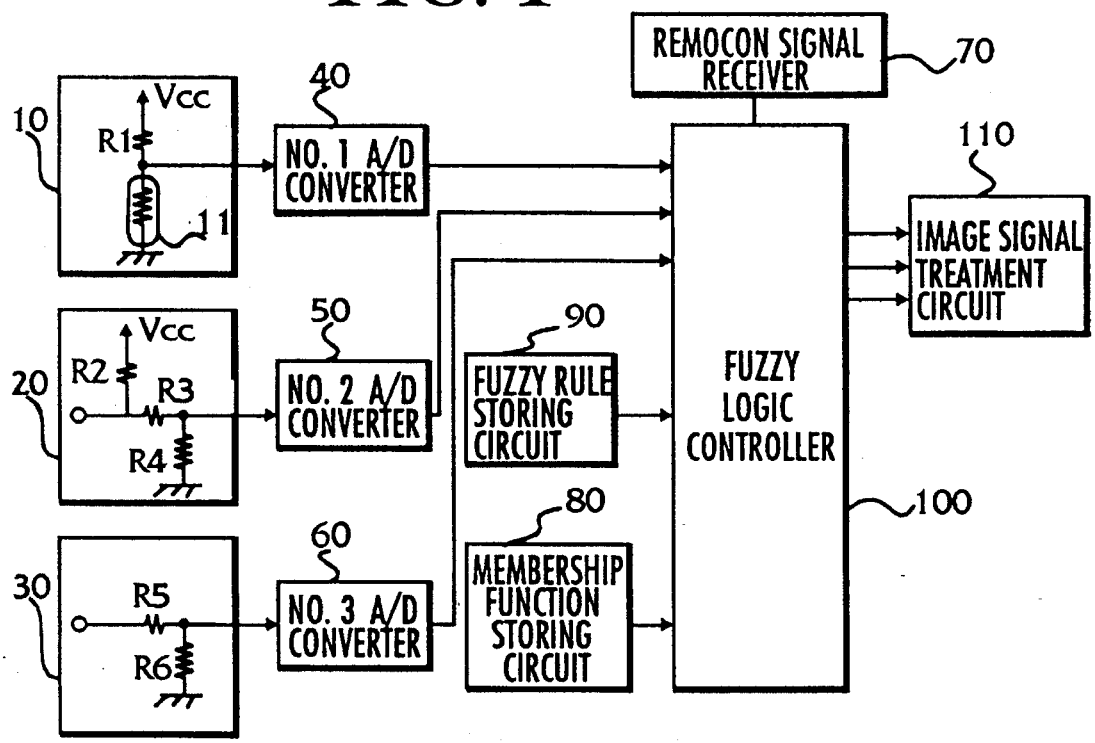
FIG. 1 illustrates a first embodiment of a picture adjustment circuit according to the present invention.

Referring to FIG. 1, a picture adjusting circuit according to the present invention, comprises:

a sensing circuit comprising first, second and third sensors 10, 20, 30 which senses the ambient brightness, picture brightness and magnitude of the RF signals;

a data converter comprising first, second and third analog/digital (A/D) converters 40, 50, 60 which converts the signals representative of the ambient brightness, picture brightness and magnitude of the RF signals sensed by the first, second and third sensors 10, 20, 30 into digital signals;

a remocon signal receiver 70 which determines a viewing distance between a remocon and a television screen in response to reception of the signals transmitted from the remocon;

a membership function storing circuit 80 which stores membership functions for discriminating the signals representative of a viewing distance determined by the remocon signal receiver 70 the digital signals representative of the and ambient brightness, picture brightness and magnitude of the RF signals digitalized by the first, second, and third A/D converters 40, 50, 60;

a fuzzy rule storing circuit 90 which stores fuzzy rules for enabling adjustment of the contrast, brightness and sharpness of a picture in response to the signals representative of the viewing distance, and the ambient brightness, picture brightness, and magnitude of the RF signals discriminated by the membership function of the membership function storing circuit 80;

a fuzzy logic circuit 100 which decides the adjusted values of the contrast, brightness and sharpness according to the digital signals representative of the ambient brightness, picture brightness, magnitude of the RF signals and the signal representative of the view distance; and an image signal treatment circuit 110 which performs the adjustment of the contrast, brightness, and sharpness of a picture according to the values decided by the fuzzy logic controller 110.

Among the above configurations, the fuzzy logic controller 100 is a publicized system described in a treatise published by KOREA Technical consultative Headquarter relating to the fuzzy logics and its application on Jan. 21, 1991.

FIG. 2A through FIG. 2E illustrate memory maps with reference to above FIG. 1.

Figure 2A:
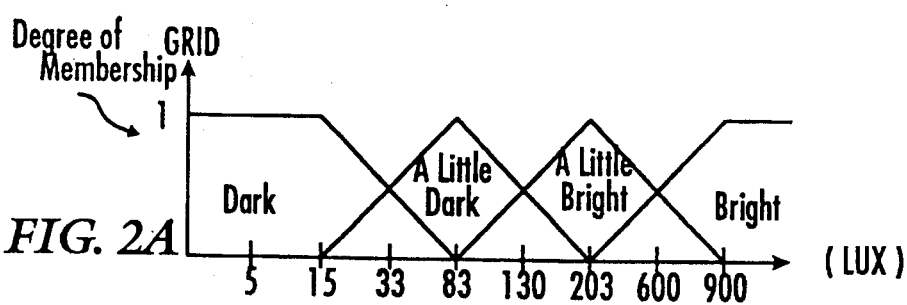
FIG. 2A through FIG. 2E illustrate memory maps in a membership function storing part as shown in FIG. 1.
Figure 2B:
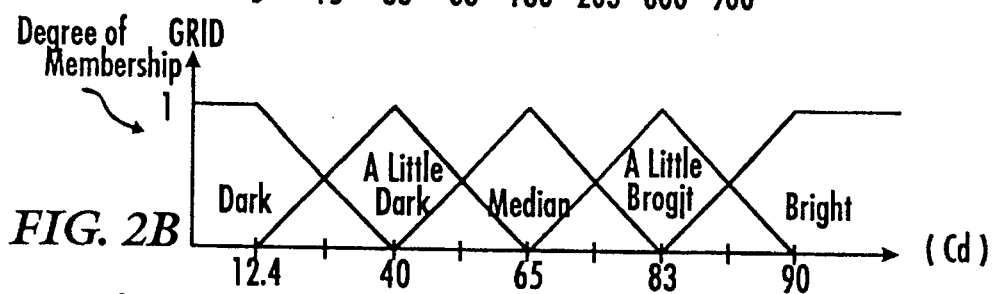
Figure 2C:
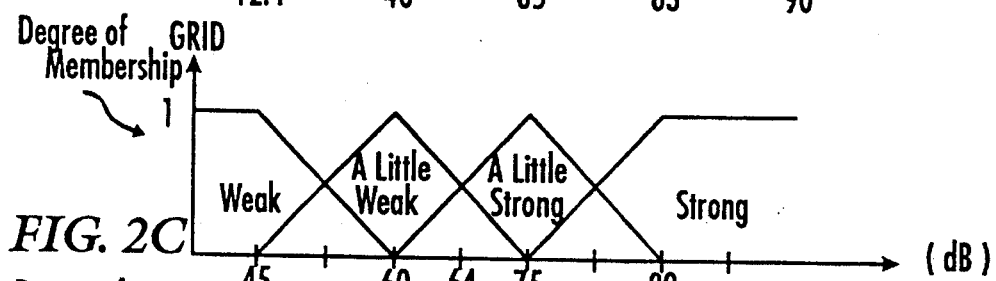
Figure 2D:
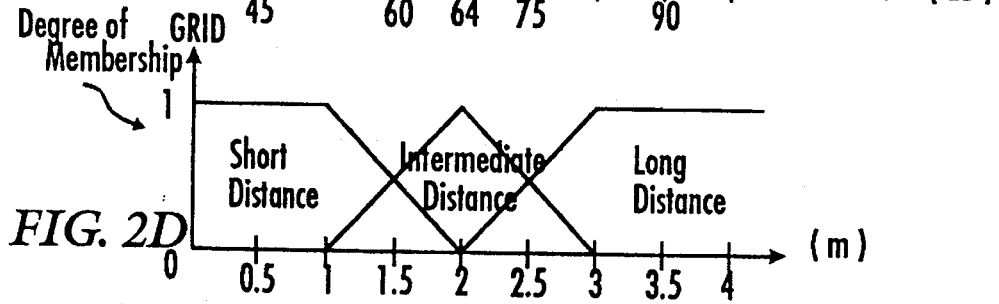
Figure 2E:
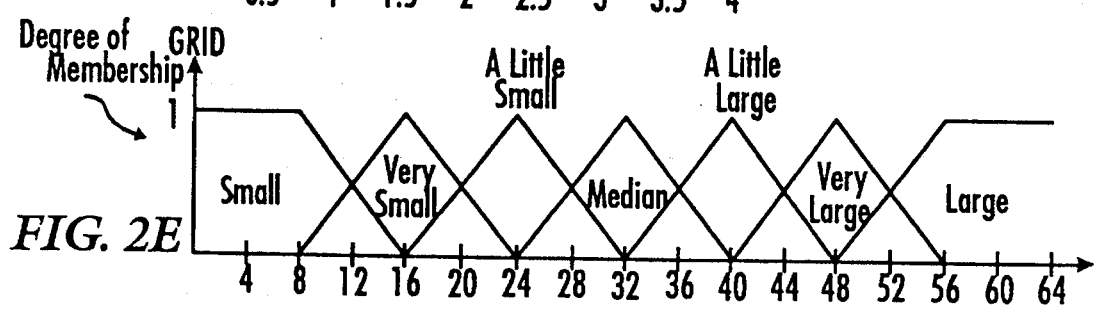

FIG. 2A illustrates a membership function according to the ambient brightness of a picture; FIG. 2B illustrates a membership function in accordance with the picture brightness of a picture; FIG. 2C illustrates a membership function according to the magnitude of the RF signals; FIG. 2D illustrates a membership function according to the viewing distance between a remote controller and the television screen; and FIG. 2E illustrates an output membership function of the contrast, brightness and sharpness of a picture.

According to the configuration explained in the above, a detailed explanation in FIG. 1 showing the operation of one embodiment of the present invention is given as below.

Voltages corresponding to the ambient brightness are detected by the first sensor 10. The voltages detected from the first sensor 10 is input into the fuzzy logic controller 100 after being converted to digital signals by the first A/D converter 40. This first sensor 10 is comprised of a photo-resistor Cds 11 having resistance varied in dependence upon the ambient light (i.e., resistance being increased in the dark and decreased in the light), a resistor R1 and a power supply $V_{cc}$. The photo-resistor Cds 11 and R1 the resistor are connected in series with the power supply $V_{cc}$. Accordingly when the ambience becomes bright, the resistance value of the photo-resistor Cds 11 becomes large, thereby resulting in an increased voltage.

At the second sensor 20, in order to detect the beam current, an automatic brightness limiter (ABL) terminal of a fly back transformer (FBT) is connected to an input terminal of the second sensor 20. The second sensor 20 itself comprises a first resistor R2 connected to a power supply $V_{cc}$, a second resistor R3 interposed between the input terminal and an output terminal and a third resistor R4 connected between the second resistor R3 and a ground terminal. When the current flowing to the ABL terminal of the FBT and through the first resistor R2, it is changed to voltage, and is divided by the second and third resistors R3 and R4, and then converted into a certain level.

The divided voltages directed by the second sensor 20 are converted to digital signals at the second A/D converter 50 and are input into the fuzzy logic controller 100.

At the third sensor 30, an automatic gain controlled (AGC) voltage of a tuner is divided by resistors R5 and R6 in order to detect the magnitude of the RF signals.

The divided voltages detected by the third sensor are converted to digital signals at the third converter 60 and are input to the fuzzy logic controller 100.

At this point, the remocon signal receivers 70, according to a remocon operation controlled by the user, supplies viewing distance information to the fuzzy logic controller 100.

Meanwhile, at the membership function storing circuit 80, the membership functions as illustrated in FIGS. 2A–2E, correspond to the ambient brightness, picture brightness, magnitude of the RF signals and the viewing distance are used to produce membership functions representative of the contrast, brightness and sharpness of a picture.

Fuzzy rules, as shown in Table I are stored in the fuzzy rule storing circuit 90.

TABLE 1

| input status | | CONTRAST | BRIGHTNESS | SHARPNESS |
|---|---|---|---|---|
| ambient brightness | dark | tone down quite a bit | tone down quite a bit | |
| | a little dark | tone down a little bit | tone down a little bit | |
| | a little dark | tone up | tone | |
| | bright | tone up quite a bit | tone up quite a bit | |
| picture brightness | dark | | | tone down quite a bit |
| | a little dark | | | tone down |

(memory map of a fuzzy rule storing circuit)

TABLE 1-continued (memory map of a fuzzy rule storing circuit)

| input status | | CONTRAST | BRIGHTNESS | SHARPNESS |
|---|---|---|---|---|
| | medium dark | | | — |
| | a little dark | | | — |
| | bright | | | — |
| magnitude of RF signals | weak | | | tone down quite a bit |
| | a little weak | | | tone down |
| | a little strong | | | tone up |
| | strong | | | tone up quite a bit |
| distance of remocon (viewing distance) | near | tone down | tone down | tone down |
| | medium | — | — | — |
| | far | tone up | tone up | tone up |

In accordance with Table 1, when the ambience is bright, the brightness and contrast levels are toned down; and when the ambience is dark, the brightness and contrast levels are toned up.

When the present picture brightness is a little dark, the sharpness level is to be toned down; and when the present picture brightness is dark, the sharpness level is to be toned down even further.

When the magnitude of the input RF signal is high, the sharpness level is to be toned up; and when the magnitude of the input RF signal is low, the sharpness level is to be toned down.

When the viewing distance is far, the contrast, brightness and sharpness levels are to be toned up; and when the viewing distance is near, the contrast, brightness and sharpness levels are to be toned down.

These kinds of fuzzy rules are stored in the fuzzy rule storing circuit 90.

Therefore, at the above fuzzy logic controller 100, the digital signals representative of the ambient brightness, picture brightness and magnitude of the RF signals from the first, second and third A/D converters 40, 50, 60, and the viewing distance information detected by the remocon signal receiver part 70 are discriminated by the membership function storing circuit 80, and then, the adjusted magnitude values representative of the contrast, brightness and sharpness of a picture from the fuzzy rule storing circuit 90 are determined, and thereafter output to an image signal treatment circuit 110.

When the image signals are displayed on the screen from the image signal treatment circuit 110, the contrast, brightness and sharpness of the picture are adjusted in response to the values determined from the fuzzy logic circuit 100.

Figure 3:
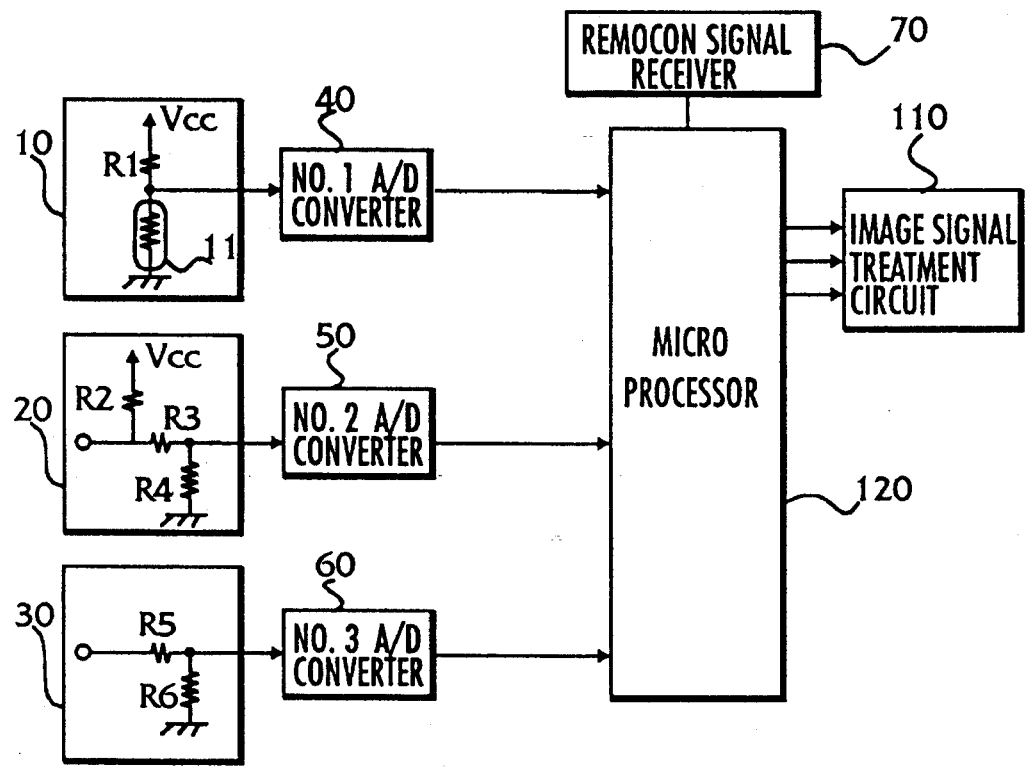
FIG. 3 illustrates another embodiment of a picture adjustment circuit according to the present invention.

FIG. 3 illustrated another embodiment of the picture adjustment circuit according to the present invention, which comprises:

a sensing circuit comprising first, second and third sensors 10, 20, 30 which senses the ambient brightness, picture brightness and magnitude of RF signals;

a data converter comprising first, second and third A/D converters 40, 50, 60 which converts the signals representative of the ambient brightness, picture brightness and magnitude of the RF signals detected at the first, second, and third sensors 10, 20, 30 into digital signals;

a remocon signal receiver 70 which discriminates the viewing distance between a remocon and a television screen in response to reception of the signals transmitted from a remocon;

a microprocessor 120 which determines the ambient brightness, picture brightness and magnitude of the RF signals digitalized at the first, second and first A/D converters 40, 50, 60 and determines the adjusted values of the contrast, brightness and sharpness after receipt of the signals representative of the viewing distance discriminated by the remocon signal receiver 70; and an image signal treatment circuit 110 which performs adjustment of contrast, brightness and sharpness according to the values determined by the microprocessor 120.

At this point, in the memory of the microprocessor, look-up tables as shown in Tables 1, 2, 3 are stored.

Accordingly, the voltages corresponding to the ambient brightness are detected by the first sensor as shown in FIG. 3.

The voltages detected from the first sensor are converted into digital signals by the A/D converter 40 and are input into the microprocessor 120.

At this moment, at the first sensor 10, the photo-resistor Cds 11 which has resistance varying in dependence upon the ambient light is connected in series to a resistance R1, and to a power supply $V_{cc}$.

Accordingly, when the ambience becomes bright, the resistance value of the photo-resistor Cds 11 becomes small, and the detected voltages are reduced. Similarly, when the ambience becomes dark, the resistance value of the photo-resistor Cds 11 becomes large, and the detected voltages are increased.

At the second sensor, in order to extract the beam current, the input terminal is connected to an ABL terminal of a FBT (fly back transformer), the current flowing to the ABL terminal of the FBT through a resistance R2 are transformed into voltages and are divided by resistors R3 and R4 in order to output at a certain level.

The divided voltages at the second sensor 20 are transformed to digital signals at the second A/D converter 50 and are input into the microprocessor 120.

At the third sensor, AGC voltages of a tuner are divided by the resistors R5 and R6 in order to produce the instantaneous magnitude of the RF signals.

The divided voltages extracted at the third sensor 30 are transformed to digital signals by the third A/D converter 60 and are input into the microprocessor 120.

At the moment, the remocon signal receiver part 70, according to the remocon operation controlled by the user, supplies the viewing distance information to the microprocessor 120.

Therefore, the microprocessor 120, according to the respective input signals, reads the data look-up tables as shown in Tables 1, 2 and 3, and determines adjusted values of the contrast, brightness and sharpness in order to provide an output to the image signal treatment circuit 110.

At the image signal treatment circuit 110, when image signals are displayed on a television screen, the adjustment of contrast, brightness and sharpness of a picture are performed based on the adjusted values determined by the microprocessor 120.

Figure 4:
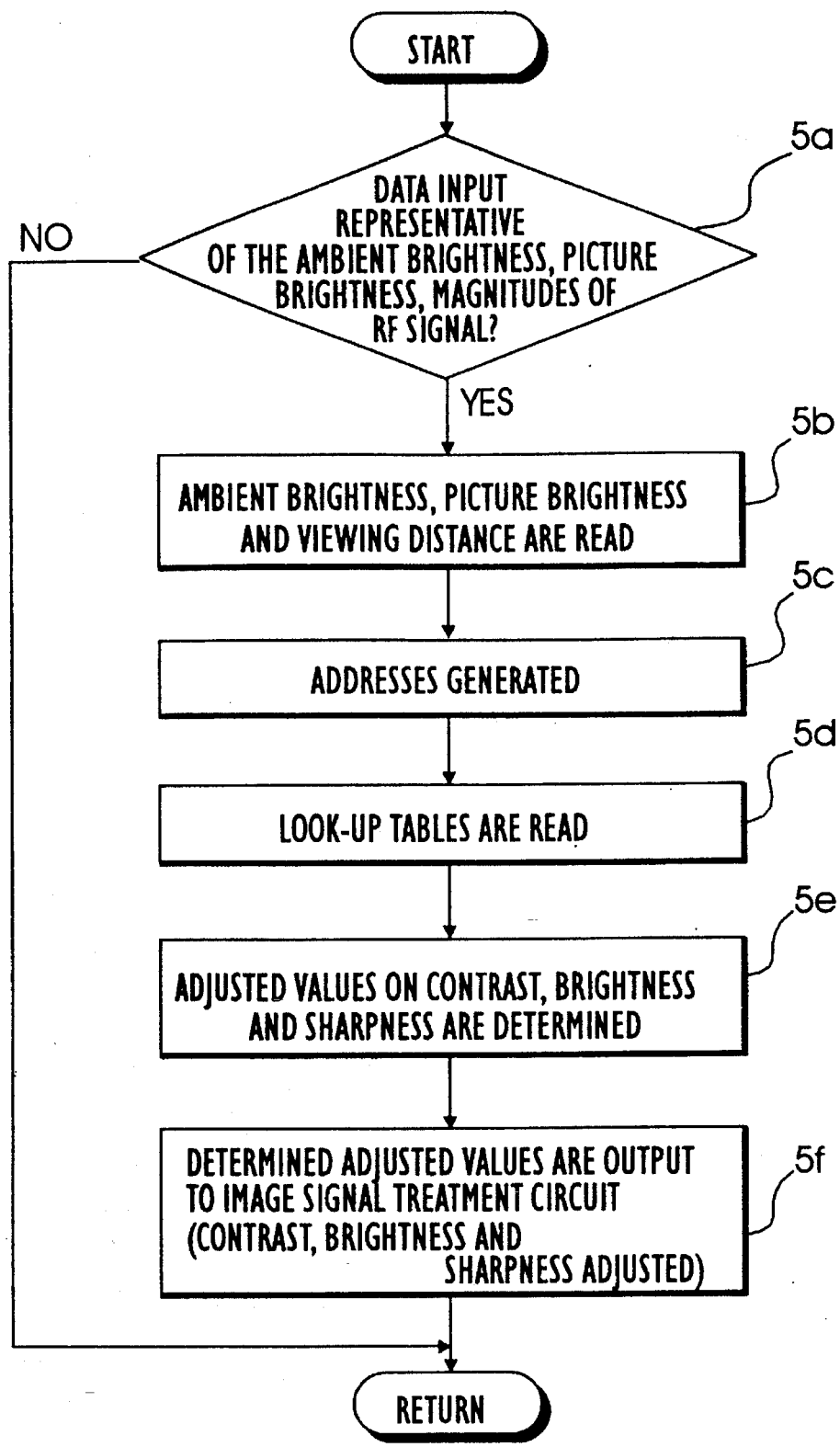
FIG. 4 is a flow chart illustrating a picture adjusting method according to the present invention.

FIG. 4 is a flow chart showing an adjusting method of a screen for determining the adjusted values of the contrast, brightness and sharpness of a picture by the microprocessor 120, which comprises the steps of:

- a first process which generates addresses by reading information data representative of the ambient brightness, picture brightness, magnitudes of the RF signals and the viewing distance; and
- a second process which adjusts the contrast, brightness and sharpness of a picture by determining the adjusted values according to the data of the look-up tables corresponding to the addresses produced by the first process.

According to FIG. 4, the first process consists of three steps, i.e.:

- a data input discrimination step 5a which discriminates whether the data representing the ambient brightness, picture brightness, magnitude of the RF signals and the viewing distance is input;
- a data input step 5b which reads of data on ambient brightness, picture brightness, magnitudes of the Rf signals and viewing distances when it is judged at the data input discrimination step 5a that data is input; and finally
- an address generating step 5c which generates addresses according to the data read at above data input step 5b.

The second process also consists of three steps, i.e.:

- a data reading step 5d which reads of data corresponding to the look-up table according to addresses generated from the address generating step 5c of the first process;
- a picture adjusted value determination step 5e which determines the adjusted values of the contrast, brightness and sharpness according to the data read from the data reading step 5d; and
- a picture adjustment step 5f which adjusts the contrast, brightness and sharpness of a picture according to the adjusted values from the above picture adjusted value determination step 5e.

As explained in the above, the present invention, utilizing the fuzzy logic reasoning, can reproduce an enhanced picture resolution by adjusting the contrast, brightness and sharpness automatically in accordance with the ambient brightness, picture brightness, magnitude of the RF signals and the viewing distance.

The foregoing description of the preferred embodiment has been presented for the purpose of illustration and description.

It is not intended to limit the scope of this invention. Many modifications and variations are possible in light of above teaching. It is intended that the scope of the invention be defined by the claims.

TABLE 2

CONTRAST picture contrast

|  |  | 7 | 6 | 5 | 4 | 3 | 2 | 1 | 0 |
|---|---|---|---|---|---|---|---|---|---|
| remocon | 0 | −5 | −5 | −3 | −2 | −1 | 0 | 1 | 3 |
| distance | 1 | −4 | −3 | −1 | 0 | 1 | 2 | 3 | 4 |
|  | 2 | −3 | −1 | 1 | 2 | 3 | 4 | 5 | 6 |

TABLE 3

BRIGHTNESS ambient brightness

|  |  | 7 | 6 | 5 | 4 | 3 | 2 | 1 | 0 |
|---|---|---|---|---|---|---|---|---|---|
| remocon | 0 | −5 | −4 | −3 | −2 | −1 | 0 | 1 | 3 |
| distance | 1 | −3 | −2 | −1 | 0 | 1 | 2 | 3 | 4 |
|  | 2 | −1 | 0 | 1 | 2 | 3 | 4 | 5 |  |

TABLE 4

SHARPNESS

Field Strength

|  |  | 0 | 1 | 2 | 3 | 4 | 5 | 6 | 7 |
|---|---|---|---|---|---|---|---|---|---|
| picture | 0 | +5 | +5 | +5 | −2 | 0 | −1 | −2 | −2 |
| bright- | 1 | +4 | +4 | +4 | 0 | 0 | −1 | −2 | −3 |
| ness | 2 | +4 | +4 | +4 | 0 | −1 | −2 | −3 | −4 |
|  | 3 | +3 | +3 | +3 | −1 | −1 | −2 | −4 | −5 |
|  | 4 | +1 | +1 | +1 | −1 | −2 | −3 | −5 | −6 |
|  | 5 | −1 | −1 | −1 | −2 | −3 | −4 | −6 | −8 |
|  | 6 | −3 | −3 | −3 | −4 | −5 | −6 | −8 | −10 |
|  | 7 | −6 | −6 | −6 | −7 | −7 | −8 | −10 | −12 |

What is claimed is:

1. A picture adjusting method of a color television, comprising:

a first process for generating addresses in dependence upon information data respectively representative of an ambient brightness in an environment surrounding said color television, a picture brightness, an instantaneous magnitude of video signals representative of a visual display on a screen of said color television and a viewing distance between a viewer and said color television by determining whether the information data respectively representative of the ambient brightness, the picture brightness, the instantaneous magnitude of the video signals and the viewing distance is input, and reading the information data when the information data is input; and a second process for adjusting contrast, brightness and sharpness of the visual display on said screen of the color television by reading corresponding data from a look-up table comprising a plurality of fuzzy inference rules and membership functions defining different levels of contrast, brightness and sharpness of the visual display according to the addresses generated from said first process, determining adjusted values respectively representative of the contrast, the brightness and the sharpness of the visual display on the screen according to the information data, and adjusting the contrast, the brightness and the sharpness of the visual display on the screen according to the adjusted values.

2. The picture adjusting circuit as claimed in claim 1, further comprised of said membership functions defining the ambient brightness as being one of dark, slightly dark, slightly bright and bright, the picture brightness as being one of dark, slightly dark, medium dark, slightly bright and bright, the magnitude of said video signals as being one of weak, slightly weak, slight strong and strong, and the viewing distance as being one of near, medium and far from the color television, and said fuzzy inference rules controlling the contrast, brightness and sharpness of the image in dependence upon said membership functions.

3. A picture adjusting circuit of a color television, comprising:

sensing means for generating sensed signals by sensing an ambient brightness in an environment surrounding the color television, a picture brightness and a magnitude of video signals representative of an image on a display screen;

data converting means for converting the sensed signals respectively representative of the ambient brightness, the picture brightness and the magnitude of said video signals into digital signals respectively representative of said ambient brightness, said picture brightness and the magnitude of said video signals;

remocon receiving means for receiving a remote control signal from a remote controller, and for generating a distance detected signal upon a detection of a viewing distance between said remote controller and said color television in dependence upon said remote control signal;

membership function storing means having a plurality of membership functions, for providing discriminated signals by discriminating amplitude levels of the distance detected signal and the digital signals respectively representative of the ambient brightness, the picture brightness and the magnitude of said video signals in dependence upon said plurality of membership functions;

fuzzy rule storing means having a look-up table of a plurality of fuzzy rules for controlling contrast, brightness and sharpness of the discriminated signals respectively representative of the ambient brightness, the picture brightness, the magnitude of said video signals and the viewing distance;

fuzzy logic means for determining adjusted values respectively representative of the contrast, the brightness and the sharpness according to the digital signals representative of the ambient brightness, the picture brightness, the magnitude of said video signals and the viewing distance; and image signal treatment means for performing the adjustment of the contrast, the brightness and the sharpness of the image on the display screen according to said adjusted values.

4. The picture adjusting circuit of a color television according to claim 3, wherein said sensing means comprises:

a first sensor consisting essentially of a photo-resistor, for detecting the ambient brightness in the environment surrounding said color television;

a second sensor coupled to receive an output voltage of an automatic brightness limiter, for detecting the picture brightness of said image on the color television; and a third sensor coupled to receive said video signals from a tuner, for detecting the amplitude of said video signals.

5. The picture adjusting circuit of a color television according to claim 4, wherein said second sensor comprises:

an input terminal coupled to receive the output voltage of the automatic brightness limiter;

an output terminal for providing the picture brightness;

a first resistor interposed between said input terminal and a power source;

a second resistor interposed between said input terminal and said output terminal; and a third resistor interposed between said second resistor and ground.

6. The picture adjusting circuit of a color television according to claim 4, wherein said third sensor comprises:

an input terminal coupled to receive the video signals;

an output terminal for providing the amplitude of said video signals;

a first resistor interposed between said input terminal and said output terminal; and a second resistor interposed between said input terminal and ground.

7. The picture adjusting circuit as claimed in claim 3, wherein said ambient brightness is defined by said membership functions as an input status of one of dark, slightly dark, slightly bright and bright, said picture brightness is defined by said membership function as input status of one of dark, slightly dark, medium dark, slightly bright and bright, said magnitude of said video signals is defined by said membership functions as input status of one of weak, slightly weak, slight strong and strong, and said viewing distance is defined by said membership functions as input status of one of near, medium and far from the color television, for respectively controlling the contrast, brightness and sharpness of the image in dependence upon the input status of each of said ambient brightness, said picture brightness, said magnitude of said video signals and said viewing distance of the remote controller from the color television.

8. A picture adjusting circuit of a color television, comprising:

means for receiving video signals representative of an image on said color television;

sensing means for generating sensed signals by sensing an ambient brightness in an environment surrounding the color television, a picture brightness and a magnitude of said video signals;

data converting means for converting the sensed signals respectively representative of the ambient brightness, the picture brightness and the magnitude of said video signals into digital signals respectively representative of the ambient brightness, the picture brightness and the magnitudes of said video signals;

remocon receiving means for generating a distance detected signal in dependence upon a detection of a viewing distance between a viewer and said color television;

processor means comprising a plurality of fuzzy inference rules and membership functions representative of different levels of contrast, brightness and sharpness of said image, for determining adjusted values respectively representative of the contrast, the brightness and the sharpness of the image on the display screen based on said fuzzy inference rules and said membership functions in dependence upon reception of the distance detected signal and the digital signals respectively representative of the ambient brightness, the picture brightness and the magnitude of said video signals; and image signal treatment means for performing the adjustment of the contrast, the brightness and the sharpness of the image on the color television according to the adjusted values.

9. The picture adjusting circuit of a color television according to claim 8, wherein said sensing means comprises:
- a first sensor consisting essentially of a photo-resistor, for detecting the ambient brightness;
- a second sensor coupled to receive an output voltage of an automatic brightness limiter, for detecting the picture brightness; and
- a third sensor coupled to receive said video signals from a tuner, for detecting the amplitude of said video signals.

10. The picture adjusting circuit of a color television according to claim 9, wherein said second sensor comprises:
- an input terminal coupled to receive the output voltage of the automatic brightness limiter;
- an output terminal for providing the picture brightness;.
- a first resistor interposed between said input terminal and a power source;
- a second resistor interposed between said input terminal and said output terminal; and
- a third resistor interposed between said second resistor and ground.

11. The picture adjusting circuit of a color television according to claim 9, wherein said third sensor comprises:
- an input terminal coupled to receive the video signals;
- an output terminal for providing the amplitude of said video signals;
- a first resistor interposed between said input terminal and said output terminal; and
- a second resistor interposed between said input terminal and ground.

12. A picture adjusting circuit, comprising:
- means for generating a first signal corresponding to instantaneous magnitude of a video signal representative of an image for a visual display, for generating a second signal representative of brightness of the image for said visual display, and for generating a third signal representative of ambient light in an environment surrounding said visual display;
- means for receiving remote control signals from a remote controller for regulating said visual display, and for generating a fourth signal representative of a distance between said visual display and said remote controller in dependence upon said remote control signals;
- means for adjusting contrast, brightness and sharpness of the image for said visual display in dependence upon said first, second, third and said fourth signals, said contrast, brightness and sharpness adjusting means comprises:
  - membership function storing means having a plurality of membership functions, for discriminating amplitudes of said first, second, third and fourth signals in dependence upon said plurality of membership functions to respectively provide first, second, third and fourth discriminated signals;
  - fuzzy rule storing means having a look-up table of a plurality of fuzzy inference rules for controlling contrast, brightness and sharpness of the image for said visual display in dependence upon said first, second, third and fourth discriminated signals;
  - fuzzy logic means for determining adjusted values respectively representative of the contrast, the brightness and the sharpness of the image for said visual display in dependence upon said first, second, third and fourth discriminated signals; and
- image signal treatment means for performing the adjustment of the contrast, the brightness and the sharpness of the image for said visual display according to said adjusted values.

13. The picture adjusting circuit according to claim 12, further comprised of said membership functions defining the ambient brightness as being one of dark, slightly dark, slightly bright and bright, the picture brightness as being one of dark, slightly dark, medium dark, slightly bright and bright, the magnitude of said video signals as being one of weak, slightly weak, slight strong and strong, and the viewing distance as being one of near, medium and far from the color television, and said fuzzy inference rules controlling the contrast, brightness and sharpness of the image in dependence upon said membership functions.

14. The picture adjusting circuit according to claim 12, wherein said means for generating said first, second and third signals comprises:
- first sensor means coupled to receive said video signal from a tuner, for detecting the instantaneous magnitude of said video signal to provide said first signal;
- second sensor means coupled to receive an output voltage of an automatic brightness limiter, for detecting the brightness of said image on the visual display to provide said second signal; and
- third sensor means consisting essentially of a photo-resistor, for detecting the ambient light in the environment surrounding said visual display to provide said third signal.

15. The picture adjusting circuit according to claim 14, wherein said first sensor means comprises:
- an input terminal coupled to receive said video signal;
- an output terminal for providing said first signal representative of the instantaneous magnitude of said video signal;
- a first resistor interposed between said input terminal and said output terminal; and
- a second resistor interposed between said input terminal and ground.

16. The picture adjusting circuit according to claim 14, wherein said second sensor means comprises:
- an input terminal coupled to receive the output voltage of the automatic brightness limiter;
- an output terminal for providing said second signal representative of the brightness of said image on the visual display;
- a first resistor interposed between said input terminal and a power source;
- a second resistor interposed between said input terminal and said output terminal; and
- a third resistor interposed between said second resistor and ground.

17. The picture adjusting circuit as claimed in claim 12, wherein said first signal is defined by said membership functions as magnitude of the video signal having an input status of one of weak, slightly weak, slight strong and strong, said second signal is defined by said membership function as brightness picture having an input status of one of dark, slightly dark, medium dark, slightly bright and bright, said third signal is defined by said membership functions as ambient light having an input status of one of dark, slightly dark, slight bright and bright, and said fourth signal is defined by said membership functions as distance between said visual display and said remote controller having an input status of one of near, medium and far from the color television, for respectively controlling the contrast, brightness and sharpness of the image in dependence upon the input status of each of said first, second, third and fourth signals.

18. A picture adjusting method of a television, comprising the steps of:

provideing sensed signals varying in dependence upon values obtained by sensing an ambient brightness in an environment surrounding the television, sensing a picture brightness of a visual display provided on a display screen of the television, and sensing a magnitude of video signals representative of an image within said visual display;

generating, in response to reception of a remote control signal from a remote controller, a detected distance signal upon detection of a viewing distance between said remote controller and said television;

determining adjusted values selected from a plurality of fuzzy, inference rules and membership functions representative of different levels of contrast, brightness and sharpness of the image in dependence upon the sensed signals representative of the ambient brightness, the picture brightness, the magnitude of said video signals and the detected distance signal; and adjusting the contrast, the brightness and the sharpness of the image according to said adjusted values.

19. A picture adjusting method for a television, comprising the steps of:

receiving video signals representative of an image formed on a display screen said television;

generating sensed signals by sensing an ambient brightness in an environment surrounding the color television, a picture brightness of the display screen and a magnitude of said video signals representing the image;

generating a detected distance signal in dependence upon detection of a viewing distance between a remote controller and said television;

determining adjusted values based on a plurality of membership functions each defining the ambient brightness as different ones of dark, slightly dark, slightly bright and bright, the picture brightness as different ones of dark, slightly dark, medium dark, slightly bright and bright, the magnitude of said video signals as different ones of weak, slightly weak, slight strong and strong, and the viewing distance as different ones of near, medium and far from the color television, and a corresponding plurality of fuzzy inference rules each controlling the contrast, brightness and sharpness of the image in dependence upon said membership functions in dependence upon reception of said detected distance signal and said sensed signals; and adjusting the contrast, the brightness and the sharpness of the image on the display screen in dependence upon the adjusted values.

* * * * *